(12) United States Patent
Kiest, Jr.

(10) Patent No.: US 9,074,718 B2
(45) Date of Patent: Jul. 7, 2015

(54) LINER TUBE WITH NON-STRETCHING MATERIAL

(75) Inventor: Larry W. Kiest, Jr., Ottawa, IL (US)

(73) Assignee: LMK Technoloogies, LLC, Ottawa, IL (US)

( * ) Notice: Subject to any disclaimer, the term of this patent is extended or adjusted under 35 U.S.C. 154(b) by 540 days.

(21) Appl. No.: 12/987,722

(22) Filed: Jan. 10, 2011

(65) Prior Publication Data

US 2012/0175004 A1    Jul. 12, 2012

(51) Int. Cl.
| F16L 55/16 | (2006.01) |
| F16L 11/00 | (2006.01) |
| F16L 55/165 | (2006.01) |
| F16L 55/179 | (2006.01) |

(52) U.S. Cl.
CPC ......... F16L 55/1651 (2013.01); F16L 55/1656 (2013.01); F16L 55/179 (2013.01)

(58) Field of Classification Search
CPC . F16L 55/1656; F16L 55/1651; F16L 55/179; F16L 55/165
USPC ............. 138/97–98, 140, 145, 153, 123, 124; 277/607; 405/150.1, 184.2; 428/35.4, 428/36.1, 36.2, 36.6
See application file for complete search history.

(56) References Cited

U.S. PATENT DOCUMENTS

| 4,976,290 | A | * | 12/1990 | Gelin et al. ...................... 138/98 |
| 5,077,107 | A | * | 12/1991 | Kaneda et al. ................ 428/36.1 |
| 5,329,063 | A | * | 7/1994 | Endoh ............................. 138/98 |
| 5,868,169 | A | * | 2/1999 | Catallo ........................... 138/98 |
| 6,360,780 | B1 | * | 3/2002 | Adolphs et al. ................. 138/98 |
| 6,508,276 | B2 | * | 1/2003 | Radlinger et al. ............. 138/125 |
| 6,732,763 | B2 | * | 5/2004 | Williamson et al. ............ 138/98 |
| 7,523,764 | B2 | * | 4/2009 | Lepola et al. ................... 138/98 |
| 7,588,055 | B2 | | 9/2009 | Kiest, Jr. |
| 2002/0033554 | A1 | * | 3/2002 | Heagy et al. .................. 264/269 |
| 2003/0217777 | A1 | | 11/2003 | Williamson et al. |
| 2007/0113971 | A1 | | 5/2007 | Driver et al. |
| 2008/0277013 | A1 | * | 11/2008 | Anders et al. ................... 138/98 |
| 2009/0056823 | A1 | | 3/2009 | Kiest, Jr. |
| 2010/0243091 | A1 | | 9/2010 | D'Hulster |

FOREIGN PATENT DOCUMENTS

GB    1452850 A  * 10/1976  ............. F16L 11/08

OTHER PUBLICATIONS

LMK Interprises, Inc., PCT/US2012/020576, International Search Report mailed May 1, 2012.

* cited by examiner

Primary Examiner — Patrick F Brinson
Assistant Examiner — Matthew Lembo
(74) Attorney, Agent, or Firm — Ryan N. Carter

(57) ABSTRACT

An apparatus and method of making a cured-in-place pipe repair to a lateral pipe having an area in need of repair. The method and apparatus use a liner assembly comprising a bladder tube and a liner tube. The liner tube comprises at least one layer of non-stretching material, which includes strands of non-stretching material oriented in the longitudinal direction of the liner tube. The strands allow radial stretching but ensure that the liner tube does not stretch longitudinally, which prevents the liner tube from stretching into a main pipe or past the area in need of repair during use. The liner tube may also comprise second and third layers of a resin impregnable material, such as felt, which surround the layer of non-stretching material such that the liner tube may be impregnated with a resinous material to repair a pipe having an area in need of repair.

44 Claims, 8 Drawing Sheets

LINER TUBE WITH NON-STRETCHING MATERIAL

FIELD OF THE INVENTION

The present invention generally relates to a method and means of repairing a pipe. More particularly, but not exclusively, the invention relates to a method and means of a cured-in-place pipe (CIPP) repair for use in repairing a lateral pipe with an access pipe and having an area in need of repair and that ends at a juncture with a main pipe.

BACKGROUND OF THE INVENTION

Cured-in-place pipe (CIPP) repair has been used to repair damaged main sewer pipes or lateral sewer pipes as well as other types of conduits. Generally, a liner tube is impregnated with a resinous material and is positioned in a pipe adjacent a damaged area of pipe. The liner tube is pressed against the wall of the damaged area of the pipe and the resin is allowed to cure, thus leaving a renewed pipe wall. The liner tube is either pulled in place or inflated and inverted into the pipe to the damaged area in need of repair.

At times, only a specific section of a lateral pipe needs repaired. The impregnated liner tube must be either inflated and inverted, or pulled through the access pipe to the exact position of the area in need of repair. One way this is accomplished is by positioning the liner tube at a specific, predetermined location within a bladder tube. The bladder tube is inflated and the bladder and liner tubes are inverted into the lateral pipe in need of repair.

One problem that commonly arises involves the type of liner tube used to make the repair. As lateral pipes extend from main pipes, it is important when repairing lateral pipes to correctly size the liner tube and position it in the bladder tube, and to prevent longitudinal stretching of the liner tube so that the liner tube does not extend into the main pipe. If the liner tube does extend into the main pipe, the liner must be cut from the main pipe so that it does not cause blockage in the pipe. While precautions may be taken to avoid the liner tube extending into the main pipe, problems exist with the current solutions.

For example, woven scrims have been used and sandwiched between two layers of absorbent material to form a non-stretching liner tube as taught in U.S. Pat. No. 6,732,763. However, the woven scrims, while limiting longitudinal stretching, also limit radial stretching. The scrims do not allow for the liner tube to be fully pressed against the walls of pipes having bends and pipe diameter changes along the length of the pipes.

Additionally, because the amount of longitudinal stretching of the liner may be unknown, it is possible that the liner may be positioned such that all of the area in need of repair is not covered. Additional lining processes would be required, adding time and expense to the process.

Accordingly, there is a need in the art for an improved method and means of lining a lateral pipe with a CIPP liner tube that does not substantially stretch lengthwise, but allows the liner to be stretched radially and pressed fully against the damaged area of the pipe.

SUMMARY OF THE INVENTION

It is therefore a primary object, feature, and/or objective of the present invention to provide an improved method and means for lining a lateral pipe through an access pipe that improves over or solves the deficiencies in the art.

It is another object, feature, and/or advantage of the present invention to provide a method and means of lining a lateral pipe that will not block the main pipe.

It is another object, feature, and/or advantage of the present invention to provide an improved liner tube for lining a lateral pipe that will not substantially stretch longitudinally, but that will allow for radial stretching.

It is another object, feature, and/or advantage of the present invention to provide a liner assembly that can be inverted into a lateral pipe to cover and repair only an area of the lateral pipe in need of repair.

It is another object, feature, and/or advantage of the present invention to provide a method and means of lining a lateral pipe that does not require cutting any of the liner after curing the material to reinstate service.

It is another object, feature, and/or advantage of the present invention to provide a method and means of lining a lateral pipe with a liner that is frangibly attached to a bladder tube.

It is another object, feature, and/or advantage of the present invention to provide a method and means of lining a lateral pipe by inverting a liner assembly through an access point and to a position where the liner accurately covers a lateral pipe from an access point, such as a cleanout, to the main pipe.

It is another object, feature, and/or advantage of the present invention to line a lateral pipe with a liner that is outside of the bladder within the lateral pipe.

It is another object, feature, and/or advantage of the present invention to provide a liner assembly that can be attached to a launcher device to be used to invert the liner assembly through the access pipe and into the lateral pipe.

These and/or other objects, features, and advantages of the present invention will be apparent to those skilled in the art. The present invention is not to be limited to or by these objects, features and advantages, and no single embodiment need exhibit every object, feature, and advantage.

According to one aspect of the present invention, a method of making a cured-in-place pipe repair to a pipe having an area in need of repair is provided. The method includes providing an elongated bladder tube having a first bladder tube end and a second bladder tube end. The method also includes providing an elongated liner tube having a first liner tube end and a second liner tube end, where the liner tube comprises a first layer having strands of a non-stretching material oriented in the longitudinal direction of the liner tube, at least a second layer comprising a resin-absorbent material disposed on a first side of the first layer, and an optional third layer comprising a resin-absorbent material disposed on a side of the first layer opposite the second layer. The liner tube is secured within the bladder tube to form a liner assembly, by frangibly connecting the liner tube to the bladder tube. The liner tube is then impregnated with a resinous material capable of curing and hardening. The liner assembly is inverted through the pipe such that the liner tube covers the area in need of repair. In one embodiment, the pipe is a lateral pipe and the area in need of repair includes a juncture of the lateral pipe and a main pipe. The resinous material is allowed to cure and harden, and finally, the bladder tube is removed to leave the liner tube cured in place at the area in need of repair.

According to another aspect of the present invention, a method of making a cured-in-place pipe repair to a lateral pipe having a launching end and an opposite second end at a juncture with a main pipe and having an area in need of repair is provided. The method includes providing an elongated bladder tube having a first bladder tube end and a second bladder tube end. The method also includes providing an elongated liner tube having a first liner tube end and a second liner tube end; where the liner tube comprises a first layer having strands of a non-stretching material oriented in a longitudinal direction of the liner tube, at least a second layer comprising a resin-absorbent material disposed on a first side of the first layer, and an optional third layer comprising a resin-absorbent material comprising a resin-absorbent material disposed on a side of the first layer opposite the second layer. A repair distance is determined by measuring the distance between a first end of the area of the lateral pipe in need of repair and the juncture of the main and lateral pipes. A non-repair distance is then determined by measuring the distance between the launching end of the lateral pipe and the first end of the area of the lateral pipe in need of repair. The length of the liner tube is sized such that it is equal to the repair distance of the area in need of repair. The liner tube is then positioned within the bladder tube such that the first end of the liner tube is spaced apart from the first end of the bladder tube by the non-repair distance, and the liner tube is secured to the bladder tube to form a liner assembly. The liner tube is impregnated with a resinous material capable of curing and hardening. The liner assembly is inverted into the lateral pipe such that the liner tube is adjacent the area of the lateral pipe in need of repair with the second end of the liner tube proximate the juncture of the main and lateral pipes. The resinous material is allowed to cure and harden, and then the bladder tube is removed from the liner tube to leave the liner tube cured in place proximate the area in need of repair within the lateral pipe without extending substantially into the main pipe.

According to yet another aspect of the present invention, a liner assembly for use in making a cured-in-place pipe repair to a pipe having a launching end and having an area in need of repair is provided. The liner assembly includes an elongated bladder tube and an elongated liner tube. The bladder tube has a first end and a second end. The liner tube has a first liner tube end and a second liner tube end. The liner tube comprises a first layer having strands of a non-stretching material oriented in a longitudinal direction of the liner tube, at least a second layer comprising a resin-absorbent material disposed on a first side of the first layer, and an optional third layer comprising a resin-absorbent material comprising a resin-absorbent material disposed on a side of the first layer opposite the second layer. Additionally, the liner tube is disposed within the bladder tube and frangibly attached to the bladder tube with the liner tube spaced apart from the first end of the bladder tube by approximately the distance between the launching end of the pipe and a first end of the area in need of repair of the pipe. The liner tube should have a length approximately equal to the distance between the first end of the area in need of repair and a second end of the area in need of repair.

DETAILED DESCRIPTION OF THE PREFERRED EMBODIMENTS

Figure 1:
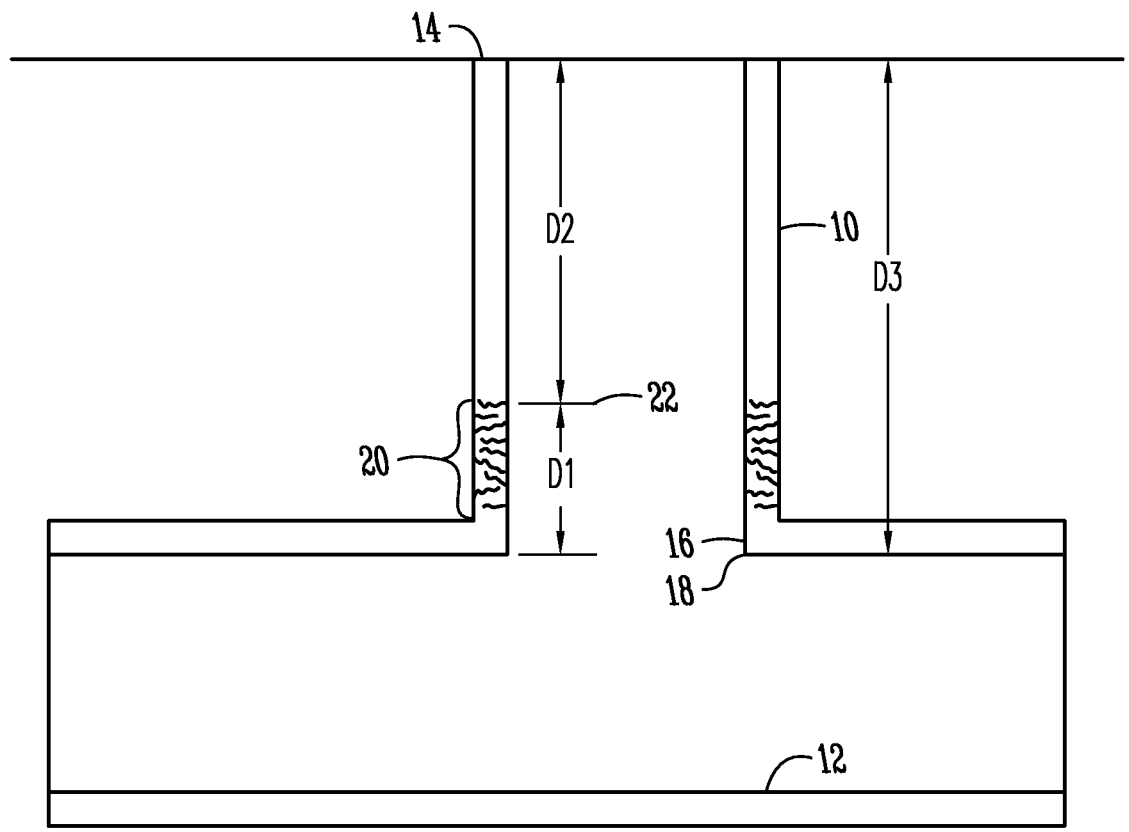
FIG. 1 is a sectional view of a juncture of a lateral pipe and a main pipe with the lateral pipe having an area in need of repair ending at the juncture between the lateral and main pipes.

FIG. 1 is a sectional view of an exemplary structure of how a lateral pipe 10 and main pipe 12 are configured. Generally, a main pipe 12 would be located between two manholes (not shown) with the lateral pipe 10 branching off from the main pipe 12 towards a house, or other structure. While FIG. 1 shows the lateral pipe 10 branching from the main pipe 12 in a tee-shape, or approximately 90°, it should be appreciated that the lateral pipe 10 may also branch off from the main pipe 12 at other angles, including wye-shaped structures. As is further shown in FIG. 1, the lateral pipe 10 may have a first or launching end 14 and an opposite second end 16, which ends at a juncture 18 between the lateral pipe 10 and the main pipe 12. Therefore, the lateral pipe 10 has a length, shown as D3 in FIG. 1. Due to changing conditions around the lateral pipe 10 including a change in the soil, environment, or vegetation surrounding the lateral pipe 10, the lateral pipe 10 may form damage spots. In particular, the damage spots, or the area in need of repair 20, may generally form closer to the juncture 18 between the lateral pipe 10 and the main pipe 12, because this area may be weaker due to the compaction level of the underlying soil, the strength of the materials used in the juncture 18, and/or the structure of the lateral pipes 10. The area in need of repair 20 may have a length, as depicted in FIG. 1. The area in need of repair 20 has length D1 starting at a first end 22 of the area of need of repair 20 and ending at the juncture 18. Thus, D1 may be known as the repair distance. This area in need of repair 20 may comprise cracks, defects in the pipe structure, areas of root infiltration, or sections of pipe where the structural integrity of the pipe is in question. In addition, the first end 22 of the area in need of repair 20 is usually a distance D2 from the first end of the lateral pipe 14. This distance may be known as the non-repair distance. Therefore, if the entire lateral pipe 10 does not need to be repaired, then a liner may only be provided to the area in need of repair 20. It should be noted that in such an embodiment, D1 added to D2 will be equal to D3. It should also be understood that large sections of pipe may be repaired using the methods of this invention, as a damaged pipe's structural integrity may be compromised at points far from a specific point of visible damage. In such cases, the area in need of repair 20 should not be limited to the area of the pipe having visible damage. The methods of this invention allow precise and accurate placement of the liner tube within a pipe at controlled intervals within a pipe in need of repair.

Figure 2A:
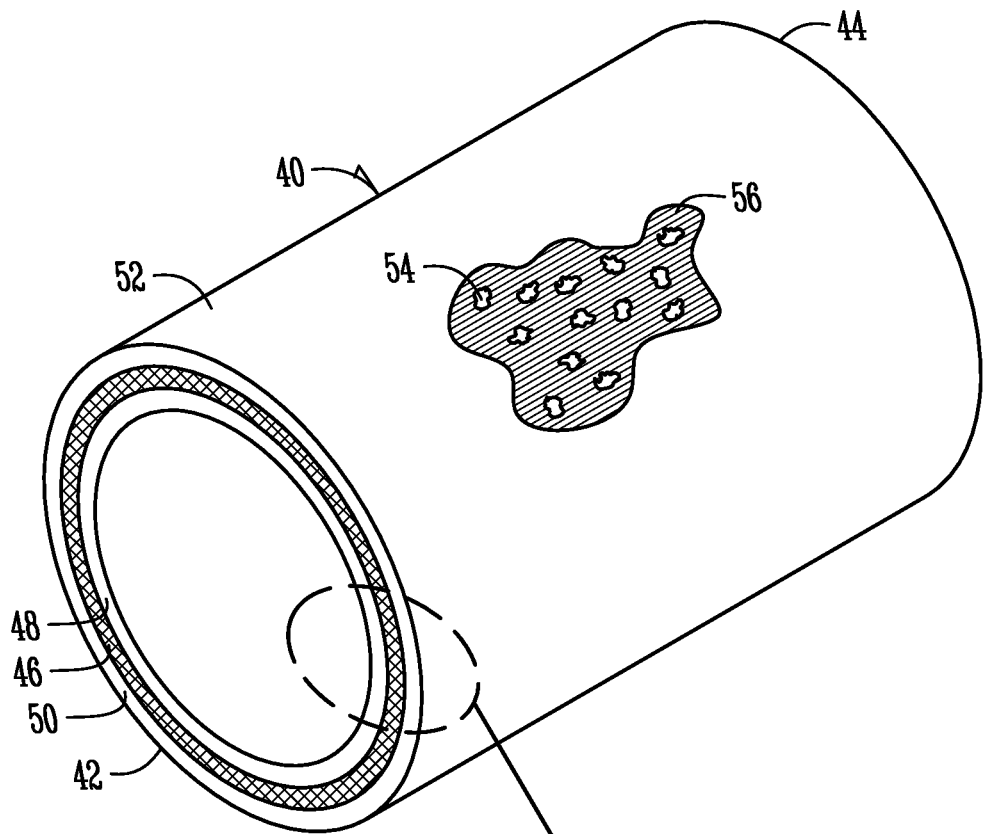
FIG. 2A is a perspective view of the liner tube of the present invention showing a portion of the first layer of the liner tube.
Figure 2B:
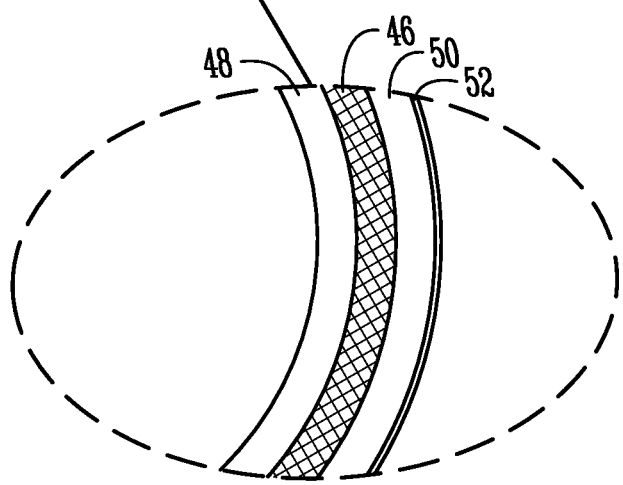
FIG. 2B is an enlarged sectional view of the of the liner tube.

FIGS. 2A and 2B show an embodiment of the preferred liner tube 40 used in the present invention. FIG. 2A is a perspective view of the liner tube 40. As shown in the embodiment depicted in FIGS. 2A and 2B, the liner tube 40 comprises three main layers. A first layer 46 comprises a plurality of strands of a substantially non-stretching material 56 positioned in a manner such that the length of the plurality strands aligns with the length of the liner tube 40. As such, the plurality of strands are said to be unidirectional and provide strength to the longitudinal or zero-degree axis of the liner tube 40. The substantially non-stretching material 56 may consist of strands of glass, fiberglass, carbon fiber, or the like, which are oriented in the longitudinal direction of the liner tube 40. The substantially non-stretching material 56 prohibits the liner tube from substantially stretching in the longitudinal direction, but allows the liner tube to stretch radially. The radial stretch is allowed because there are no strands of a non-stretching material positioned ninety-degrees to the longitudinal axis of the liner tube 40 to provide a cross-strength or bidirectional strength.

In addition, shards of glass 54, chopped glass, fibers, or the like may be added to the first layer 46 to further strengthen the structure of the first layer. The shards of glass 54 may be sporadically positioned and associated with the non-stretching material of the first layer 46 of the liner tube 40 such that the first layer does not come apart. This may be achieved by stitching or needling the non-stretch material 56 and the shards of glass 54 to one of a second layer 48 or a third layer 50 comprising a resin-absorbent material. Alternatively, the shards of glass will stick to the plurality of strands of non-stretching material upon spraying or placing the shards of glass in communication with the plurality of strands. The shards of glass 54 act to strengthen the structure of the cured liner tube because the shards of glass 54 interact with a curable resin to create a reinforced polymer composite with enhanced mechanical properties as compared to a cured resin-impregnated liner without the first layer 46. Additionally, the plurality of strands of non-stretch material 56 act to enhance the mechanical properties of the cured liner tube, including but not limited to tensile strength and flexural strength.

Also included in the liner tube 40 are a second layer 48 and an optional third layer 50 positioned on opposite sides of the first layer 46. The second and third layers 48, 50 of the liner tube 40 comprise a resin absorbent woven or non-woven material, such as felt, which may be impregnated with a resinous material. The resinous material is a material which is able to cure and harden. It may be a thermoset resin, which will cure quicker in the presence of heat or steam. However, it should be appreciated that any resinous material that can cure and harden to repair a pipe line may be used with the liner tube. In addition, the liner tube includes a first end 42 and an opposite second end 44. As shown in FIG. 2B, the liner tube 40 may also include an additional layer, which is a coating layer 52. The coating 52 may be a polymer or plastic structure that is resin, air, and/or water impervious. The coating 52 keeps the resinous material in the liner tube.

Figure 3:
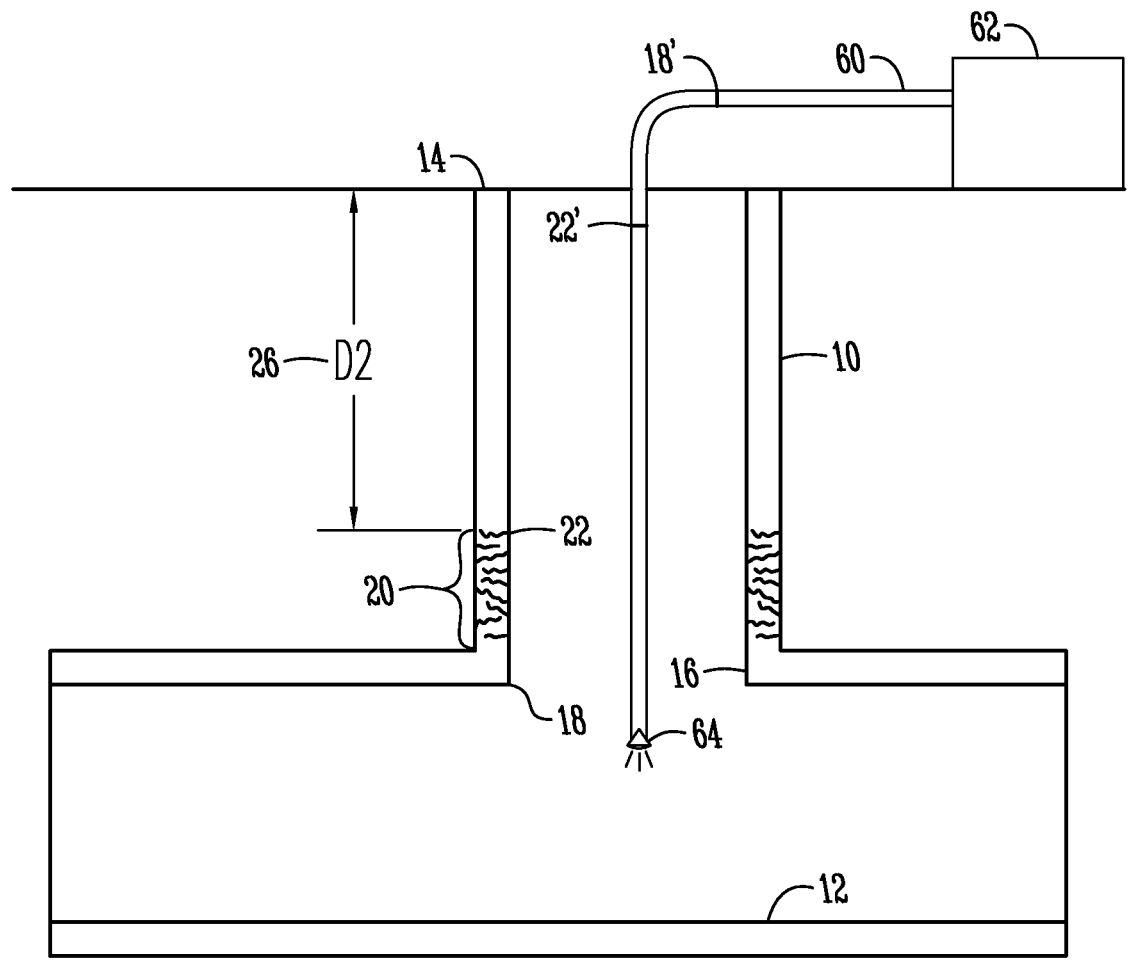
FIG. 3 is a sectional view showing the use of a photo cable to locate the position and length of the area of lateral pipe in need of repair.

FIG. 3 is a sectional view of the main and lateral pipes showing one method of measuring a repair distance, which is equal to the length of the area in need of repair 20. This repair distance, shown in FIG. 3 as 20, is equal to or less than the length of liner tube 40 needed to repair the pipe. In addition, the method shown and used in FIG. 3 measures the length of non-repair distance 26, which is generally shown as D2 in the Figures. The non-repair distance is the distance from the launching end 14 of the lateral pipe 10 to the first end 22 of the area in need of repair 20. This is the distance that the liner tube will be offset such that the appropriate length covers the entire area in need of repair 20 without extending into the main pipe 12. Having the appropriate non-repair distance will also ensure that the first end of the liner is proximate the first end 22 of the area in need of repair so that the liner does not stop short of repairing the full damaged area of the pipe. To measure the repair distance 20 and the non-repair distance 26, a camera 62, photo cable 60, and lens 64 system may be used. The lens 64 is extended into the lateral pipe 10 and connected to the camera 62 by a photo cable 60. When the camera 62 reaches the first end 22 of the area in need of repair 20, a mark, shown as 22', is made on the photo cable 60. The mark 22' lines up with the first end 22 of the area in need of repair 20. The lens 64 is then further inserted into the lateral pipe 10 until the lens 64 reaches the juncture 18 between the lateral pipe 10 and main pipe 12. At this position, a second mark, shown as 18' in FIG. 3, is made on the photo cable 60. The mark 18' lines up with the juncture 18 of the pipes. The distance between marks 22' and 18' will be equal to the length of the area in need of repair 20, which is also the length needed for the liner tube 40. In addition, the length between the lens 64 and the first mark 22' is equal to the non-repair distance 26 and is the distance that the liner tube 40 will need to be offset in the bladder tube 32, as will be discussed below. It is important that the marks on the photo cable 60 be as accurate and exact as possible such that the liner tube 40 will not extend past the juncture 18 and into the main pipe 12. In that case, a cutter (not shown) would need to come into the main pipe 12 to cut out the excess liner tube, which is timely and expensive.

Figure 4:
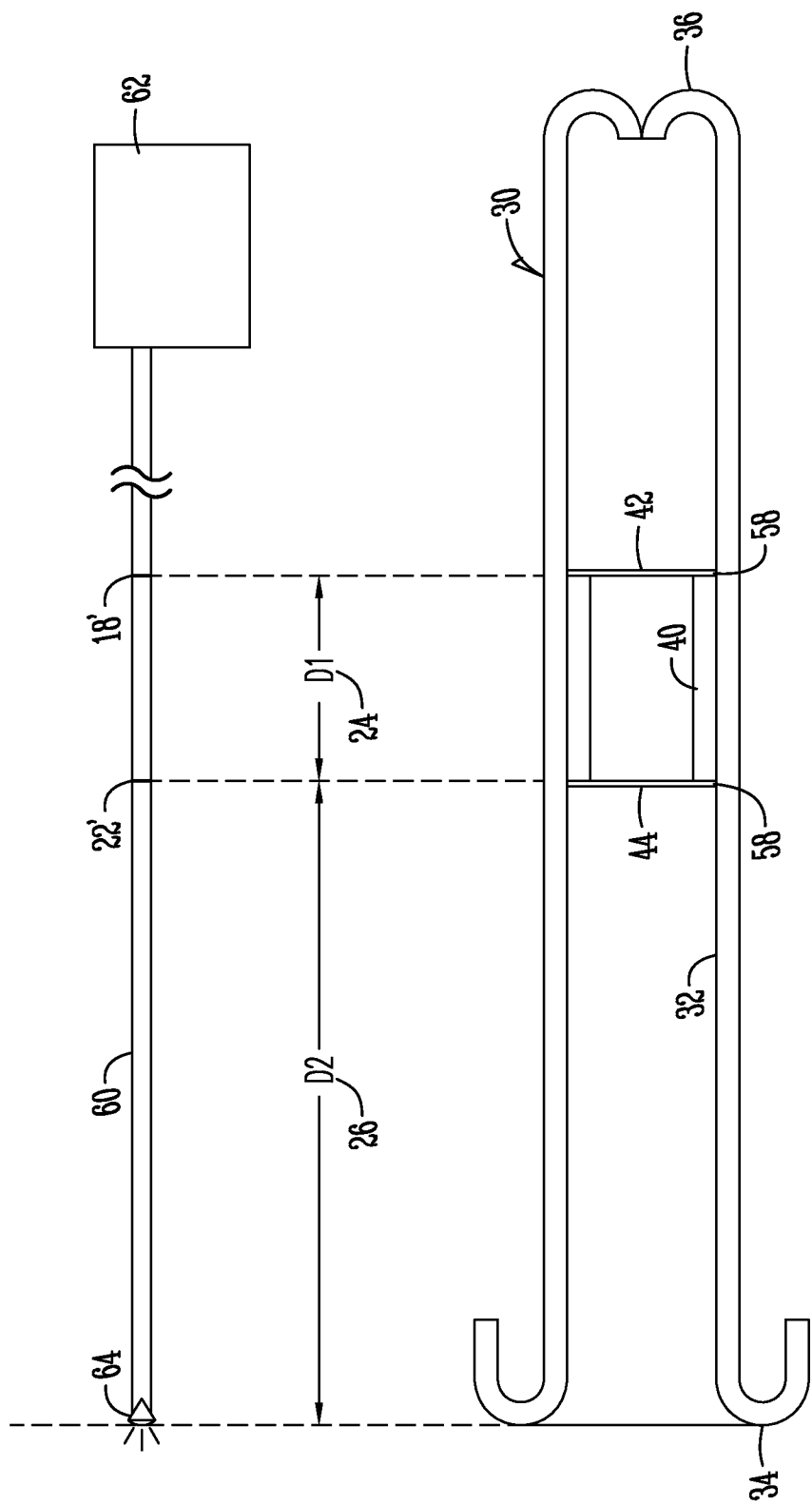
FIG. 4 is a view showing the use of the marked photo cable to determine the length of the liner tube and to position the liner tube within the bladder tube.

FIG. 4 shows how the method of FIG. 3 may be used to size the liner tube 40, and also where to position the liner tube 40 within the bladder tube 32. The bladder tube 32 comprises a first end 34 and opposite second end 36. FIG. 4 shows the bladder tube 32 first end 34 being open while the second end 36 is closed. While this is the type of bladder used in the preferred embodiment, it should be appreciated that other types of bladders may be used, including ones having both ends being open. To determine the length of the liner tube 40 needed, as well as the position of the liner tube within the bladder tube 32, first the lens 62, the marked photo cable 60, and camera 62 are laid out and extended on the ground. Next to the camera system, a bladder tube 32 should be laid out with the first end 34 of the bladder tube 32 generally aligned with the front of the lens 62. The length of the liner tube 40 is determined by measuring the distance from the first mark 22' to the second mark 18' on the photo cable 60. This distance D1 is known as the repair distance 24. An appropriate liner tube 40, as shown and described in FIGS. 2A and 2B, should be approximately equal to this distance D1. Next, the liner tube 40 must be positioned within the bladder tube 32 to form a liner assembly 30. The liner tube 40 will be positioned within the bladder tube 32, such that the liner tube 40 will line up with the area in need of repair 20 in the lateral pipe 10.

To determine the positioning of the liner tube 40, the distance D2 should be measured from the lens 62 to the first mark 22'. This distance is known as the non-repair distance 26, and will be equal to the distance between the first end 34 of the bladder tube 32 and the first end of the liner tube 42. The liner tube 40 is in position within the bladder tube 32 with the first end 42 of the liner tube 40 offset from the first end 34 of the bladder tube 32 equal to the non-repair distance 26. The second end 44 of the liner tube 40 will then be closer to the second end 36 of the bladder tube 32 and will be sized from the first end 42 of the liner tube 40 a distance equal to the repair distance 24. It should be noted that the combined distances D1 and D2 will be equal to the distance D3 from the launching end 14 of the lateral pipe 10 exactly to the juncture 18 of the main and lateral pipes. This will ensure that the liner tube 40 does not extend into the main pipe 12 as the liner tube will not stretch longitudinally due to the first layer 46 of the liner tube 40 being made from strands of substantially non-stretching material 56 oriented in a longitudinal direction.

The liner tube 40 will be frangibly connected to the bladder tube 32 at positions shown generally as 58 in FIG. 4. This connection is made by a solvent or adhesive. The solvent or adhesive (not shown) may have a high viscosity such that it will not penetrate or impregnate the liner tube 40, and will also provide a frangible connection such that the liner tube 40 is able to become detached from the bladder tube 32, as will be described below, with some ease. The viscosity of the solvent or adhesive used may be an important factor, depending on whether the liner includes a coating layer. If a coating layer is used with the liner, then the viscosity should be such that the solvent or adhesive does not run down the coating and/or impregnate a large portion of the liner, which is possible for some solvents or adhesives without a high viscosity. If a liner without a coating is used, the solvent or adhesive should have a high viscosity, such that it will attach the liner tube to the bladder, but still allow for resin impregnation of the material in the area of the liner beneath where the adhesive connection is made. It should also be noted that the length D1 of the liner tube 40 be as close as possible to the length of the area in need of repair 20 so that no excess liner is provided. Because the first layer 46 of the liner tube 40 contains substantially non-stretching material 56, the liner tube 40 should not substantially stretch in a longitudinal direction and into the main pipe 12.

Once the liner tube 40 is positioned within the bladder tube 32, the liner tube 40 should be impregnated with a resinous material capable of curing and hardening. In order to facilitate the impregnation of the liner tube 40, the bladder tube 40 may be constructed of a translucent material. During impregnation, the liner tube 40 will take on a darker appearance that resembles a wet liner tube. The use of a translucent bladder tube 32 allows a technician to visually confirm impregnation of the liner tube 40 with the resinous material capable of curing and hardening. Once the liner tube 40 is impregnated with a resinous material capable of curing and hardening, the liner tube 40 is ready for installation within a pipe.

Figure 5:
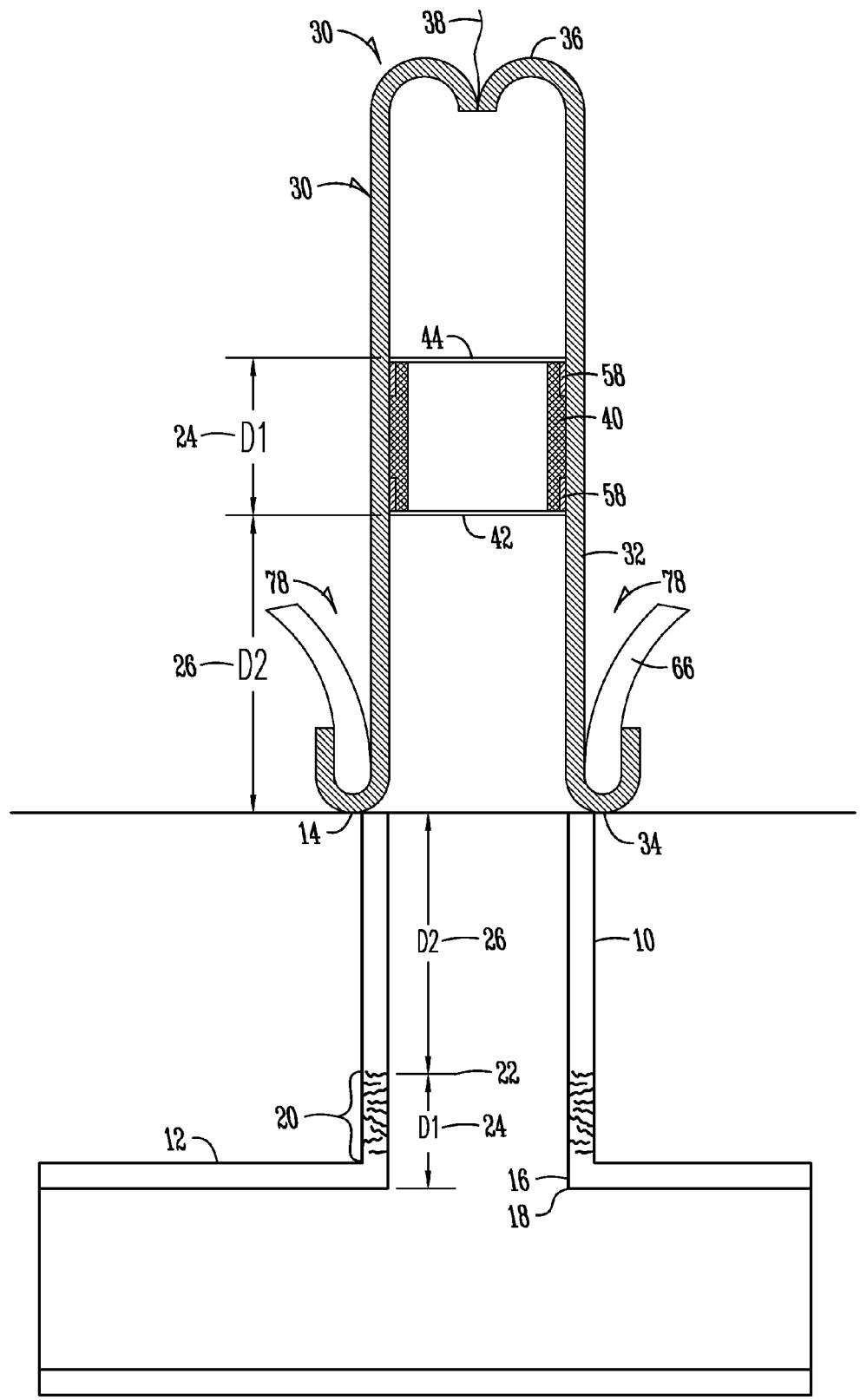
FIG. 5 is a sectional view showing the liner assembly attached to a launching device before inversion.

FIG. 5 shows an embodiment of the liner assembly 30 positioned adjacent the lateral pipe 10. The liner assembly 30 may be connected to a launching device 66 which will provide the inversion of the liner assembly 30 into the lateral pipe 10, as will be discussed in greater detail below. As shown in FIG. 5, the non-repair distance 26, also shown as D2, from the first end 14 of the lateral pipe 10 to the first end 22 of the area in need of repair 20 is equal to the distance from the first end 34 of the bladder tube 32 to the first end 42 of the liner tube 40. In addition, the length of liner tube D1 is equal to the repair distance 24, which is the distance from the first end 22 of the area in need of repair 20 to the juncture 18 of the main and lateral pipes. The liner assembly 30 may be connected to the launching device 66 so that the launching device can invert the assembly 30 into the lateral pipe 10. The launching device 66 may have wheels 80 to position the device and the liner assembly 30 in the appropriate position adjacent the lateral pipe 10. The launching device 66 works by putting the liner assembly 30 in the launcher chamber 68 and providing air or another fluid, generally shown by arrow 78 to the first end 34 of the bladder tube 32 such that the air, or other fluid, causes the bladder tube 32 and thus corresponding liner tube 40 to invert into the lateral pipe 10. Also shown in FIG. 5, a bladder line 38 is connected to the closed second end 36 of the bladder tube 32.

Figure 6:
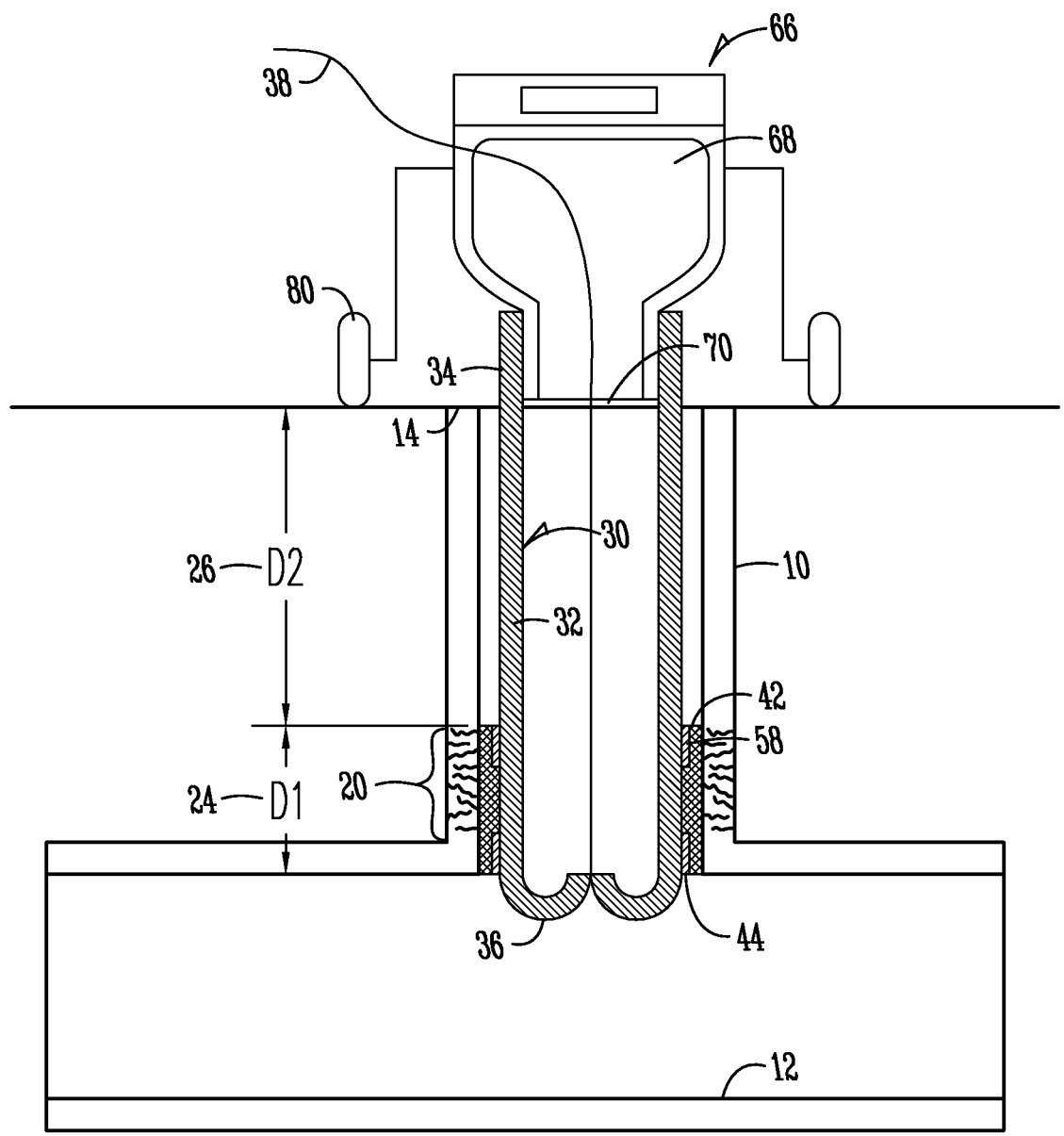
FIG. 6 is a view similar to FIG. 5 showing the liner assembly after inversion into the pipe.

FIG. 6 shows the liner assembly 30 after it has been inverted into the lateral pipe 10. The launching device 66 has added air, or another fluid, into the launching chamber 68 to press the liner assembly 30 through the launcher opening 70 and into the lateral pipe 10. The liner assembly 30 will thus invert from the launching chamber 68 into the lateral pipe 10. As shown in FIG. 6, the liner tube 40 is outside of the bladder tube 32 when the liner assembly 30 has inverted. Therefore, the liner tube 40 will be adjacent the area in need of repair 20 in the lateral pipe 10. Further introduction of air or another fluid into the bladder tube 32 will cause the bladder tube 32 to press outwardly, thus pressing the liner tube 40 against the lateral pipe 10. The pressure will be maintained until the resinous material, which has been impregnated into the liner tube 40, is allowed to cure and harden. Once the resinous material has cured and hardened, the bladder line 38 will be used to remove the bladder from the pipe. The bladder line 38 is pulled, which peels the bladder tube 32 from the liner tube 40, starting with the second end 36 of the bladder tube 32. As the bladder tube 32 has been connected to the liner tube 40 at the frangible connections 58, some force may be needed to break the connection. However, once the connection has been broken, the bladder tube 32 will become disconnected from the liner tube 40 and will be removed from the lateral pipe 10. The liner tube 40, which has cured and hardened, will remain in the lateral pipe 10 as a new surface of the lateral pipe 10. As the liner tube 40 is only adjacent the area in need of repair 20 in the lateral pipe 10, the only section that will be lined will be the area in need of repair 20. In addition, the second end 44 of the liner tube 40 will be proximate the juncture 18 between the main and lateral pipes such that the second end 44 will not extend into the main pipe 12. As shown in FIG. 6, the second end 36 of the bladder tube 32 may extend into the main pipe, but it will be removed easily through the use of the bladder line 38. It should be also noted that, because the first layer 46 of the liner tube 40 comprises strands of non-stretching material 56 oriented in the longitudinal direction of the liner tube, the liner tube 40 will not substantially stretch lengthwise during the inversion and expansion processes. Therefore, the second end 44 of the liner tube 40 will not extend into the main pipe 12 after installation. The liner tube 40 will only be located in the lateral pipe 10 directly adjacent the area in need of repair 20.

Figure 7:
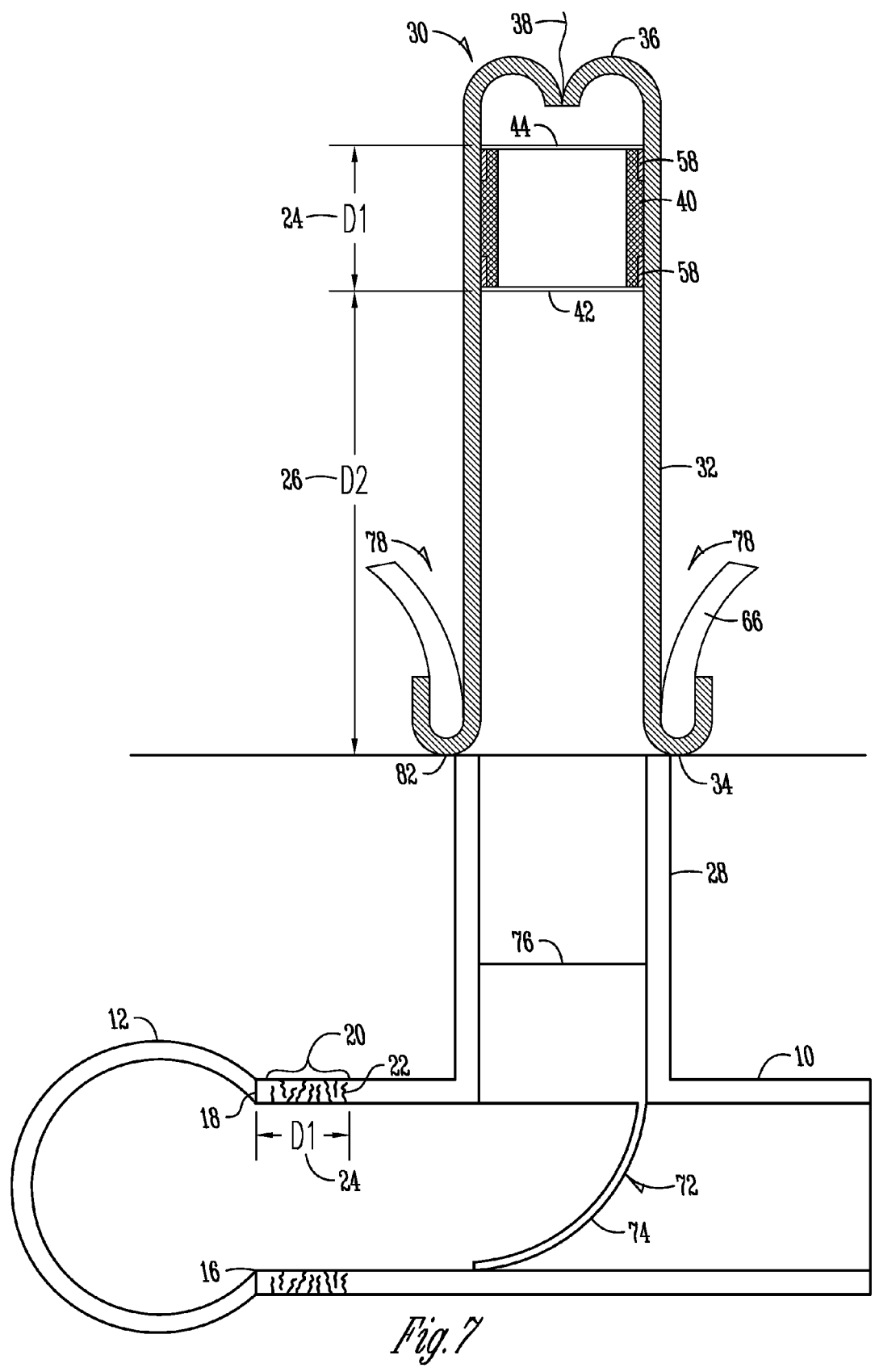
FIG. 7 is sectional view of the liner assembly of the present invention adapted to be inverted through a cleanout pipe and into a lateral pipe.
Figure 8:
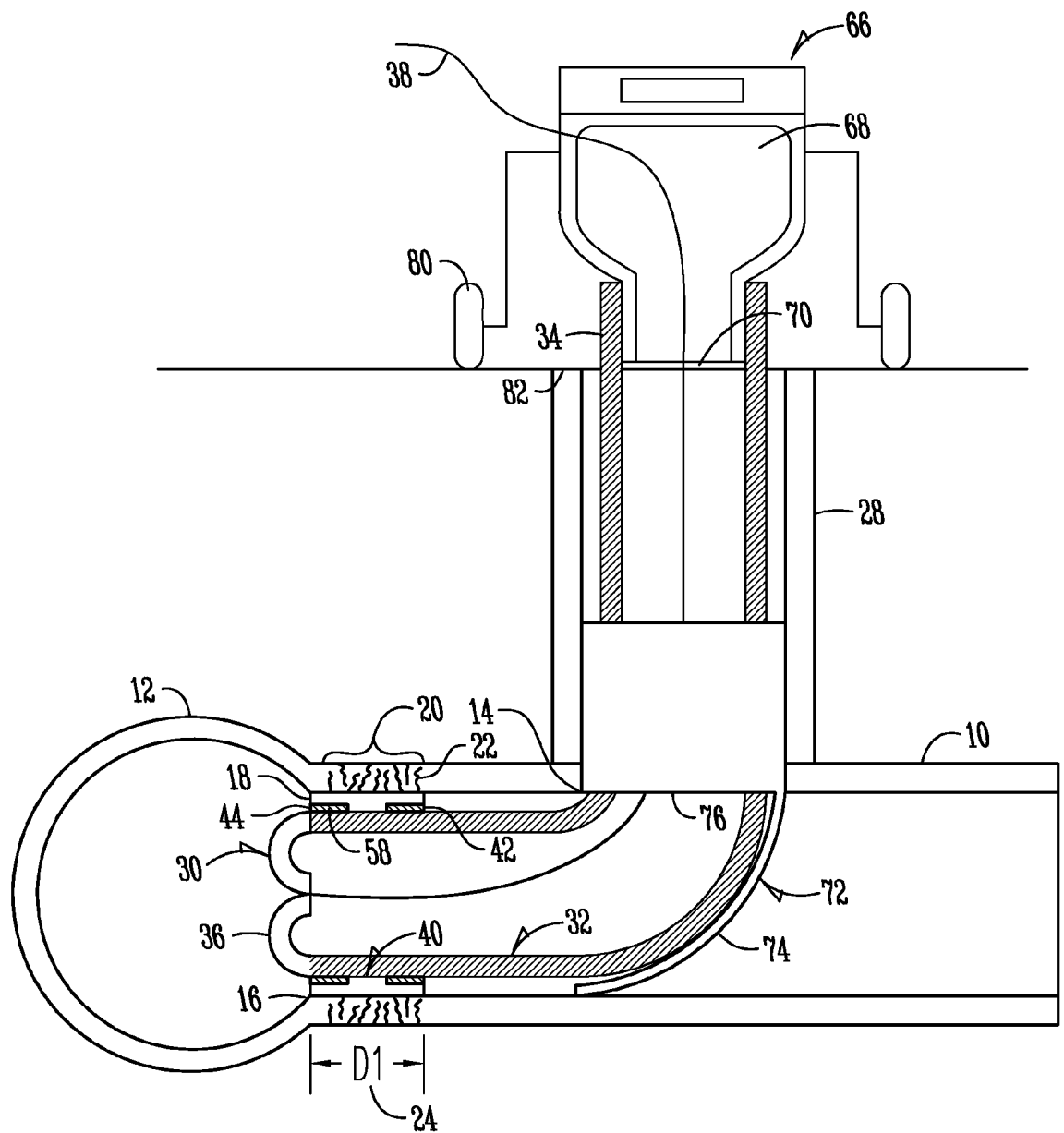
FIG. 8 is a view similar to FIG. 7 showing the liner assembly inverted through the cleanout pipe and into the lateral pipe to repair the lateral pipe.

FIGS. 7 and 8 show another embodiment of the present invention, which can be used when lining a lateral pipe 10 through a clean-out pipe 28, when there is no direct access to the lateral pipe 10. As shown in FIGS. 7 and 8, the lateral pipe 10 is generally perpendicular to the clean-out pipe 28 as well as the main pipe 12. This is not necessarily always the case, as the clean-out pipe 28 may be wye-shaped extending from the lateral pipe 10. FIG. 7 shows that the lateral pipe 10 contains an area in need of repair 20, which extends a distance D1 from a first end 22 to juncture 18 between the lateral and main pipes. In addition, the first end 22 of the area in need of repair 20 is a distance from the first or launching end of the lateral pipe 14. Therefore, the same method as described above in regards to FIGS. 3 and 4 may be used to determine both the repair distance 24, which is the length from the first end 42 to the second end 44 of the liner tube 40, as well as the non-repair distance 26, which is the length from the first end 82 of the clean-out pipe 28 to the first end 22 of the area in need of repair 20. The lens and camera system, as described above, can be used to mark the photo cable 60 to determine the distances and lengths. Accordingly, the length of the liner tube 40 can be determined and the offset distance from the first end 34 of the bladder tube 32 to the first end 42 of the liner tube 40 can also be determined. After the distances have been determined, the liner tube 40 is positioned within the bladder tube 32 and frangibly connected at the tab location 58 to create a liner assembly 30. The liner assembly 30 is then attached to a launcher device 66 and placed in position adjacent the opening of the clean-out pipe 28 similar to as described in FIG. 5. As shown in this embodiment, a guide tool 72 is used. The guide tool 72 comprises an arcuate end 74 in a hollow cylindrical end 76. The guide tool 72 is needed to help direct the liner assembly 30 as it is inverted through the clean-out pipe 28 and into the lateral pipe 10.

As shown in FIG. 8, the liner assembly 30 has been inverted through the clean-out pipe 28 and into the lateral pipe 10. As described above, the liner assembly 30, which has been located in the launcher chamber 68, is inverted by the use of air, or another fluid, directed towards the first end 34 of the bladder tube 32 as shown in arrow 78 of FIG. 7. This introduction of air, or another fluid, causes the liner assembly 30 to invert into and through the clean-out pipe 28 with the second end 36 of the bladder tube 32 leading the way. When the bladder tube 32 reaches the guide tool 72, the guide tool 72 will direct the liner assembly 30 towards the area in need of repair 20 in the lateral pipe 10. Because the guide tool 72 includes an arcuate portion 74, the inverting end 36 of the bladder tube 32 will curve at the first end 14 of the lateral pipe 10 towards the main pipe 12. The inversion will continue until the second end 44 of the liner tube 40 is proximate the juncture 18 between the lateral pipe 10 and the main pipe 12. At this position, the first end 42 of the liner tube 40 will be proximate the first end 22 of the area in need of repair 20, and the repair distance 24 will be completely lined by the liner tube 40. In addition, the liner tube 40 will not extend into the main pipe 12.

Once the resinous material impregnated into the liner tube 40 has cured and hardened, the bladder tube 32 will be removed from the pipes by the bladder line 38, as described above. The frangible connection 58 will be broken between the bladder tube 32 and liner tube 40, and the bladder tube 32 will be peeled from the liner tube 40 and out of the lateral and clean-out pipes. The launcher device containing the bladder tube 32 can be moved from the opening of the clean-out pipe, and the guide tool 72 can then be removed from the clean-out pipe 28 as well. This will leave the liner tube 40 cured in place directly adjacent the area in need of repair 20. As described above, the first layer 46 of the liner tube 40 comprises strands of non-stretching material 56 oriented in a longitudinal direction of the liner tube 40. Therefore, the liner tube 40 will not stretch longitudinally during inversion, which keeps the second end 44 of the liner tube 40 from extending into the main pipe 12. This ensures that a cutter will not be needed to remove excess liner tube 40 at a later time.

As noted above, the liner tube 40 may include a coating 52 on one side. In one embodiment, the coating side may be positioned such that the coating is frangibly connected at the tab area 58 to the bladder tube 32. After inversion into the lateral pipe 10, the coating would be on the interior of the liner tube 40 and the non-coated side of the liner tube 40 would be pressed against the pipe wall. Because the coating may be a polymer, it is structurally sound and will not rip when the bladder is removed from the liner tube 40. Alternative embodiments are contemplated where the coating is positioned such that after inversion into the lateral pipe 10, the coating is on the exterior of the liner tube 40 and pressed against the pipe wall.

It should be noted that the coating is not necessary, and that advantages may exist when a coating is not used. For example, the liner tube may be made at a lower price without the coating. The liner tube would also be more flexible without a coating, as the coating is made of a polymer and is more rigid. Further, when the normal resinous material cures and hardens, it produces a high exothermic reaction. This exothermic reaction produces high temperatures which could cause blisters in the coating that could weaken the liner tube or else create blockage in the lateral pipe. Without said coating, there would not be any worry of blisters due to the exothermic reaction. These are only some of examples of the benefits for not using a coating, and those skilled in the art would appreciate that there are more benefits.

An additional benefit of the methods of this invention is that a pipe having a transition in diameter may be easily repaired using a liner with or without a coating. For example, a total repair length of 6 feet in a pipe having a six inch diameter may include a transition that reduces the diameter of the pipe to four inches. The liner tube of this invention is capable of radially expanding against the wall of the pipe, closely conforming to the pipe wall while maintaining a constant repair length of 6 feet. Since the liner tube is capable of radial expansion but includes reinforcing fibers in the longitudinal direction of the liner tube, the liner tube is able to conform to varying pipe diameters and maintain a constant repair length. A liner tube that does not include a coating is especially suited for repairs of a pipe including a transition in diameter that require immediate attention. If a coating on the liner tube is used in a similar fashion, it may cause irregularities in the pipe wall at the transition of pipe diameter. As such, a coated liner may be fabricated that includes the diameter transition in the construction of the liner after the measurements of the repair distance have been determined. This requires custom manufacturing of each liner to specifically match the profile of each pipe. However, a non-coated liner may be fashioned at a job site to match the inner profile of the pipe to be repaired including a transition in diameter. This is done by using a liner tube with a diameter that matches the diameter of the smaller pipe at the transition. When placed against the walls of the pipe, the liner tube expands radially to match the inner diameter of the larger pipe, and closely conforms to the transition area and the smaller area of the pipe without a loss of liner length.

The invention has been shown and described above with reference to preferred embodiments, and it is understood that modification, such as deletions and additions, may be made which are within the intended spirit and scope of the invention. The invention is only to be limited by claims depended hereto.

What is claimed is:

1. A method of making a cured-in-place pipe repair to a pipe having an area in need of repair, comprising:

providing an elongated bladder tube having a first bladder tube end and a second bladder tube end;

providing an elongated liner tube having a longitudinal direction connecting a first liner tube end and a second liner tube end and comprising at least one layer comprising strands of a substantially non-stretching material substantially parallel to the longitudinal direction of the liner tube, and a second layer comprising a resin-absorbent material;

wherein the liner tube is substantially free of strands of substantially non-stretching material oriented ninety-degrees to the longitudinal direction of the liner tube to allow for radial expansion;

wherein the non-stretching material comprises strands of glass, carbon fiber, or fiber glass oriented substantially parallel to the longitudinal direction of the liner tube;

securing the liner tube within the bladder tube to form a liner assembly;

impregnating the liner tube with a resinous material capable of curing and hardening;

inverting the liner assembly through the pipe such that the liner tube covers the area in need of repair;

allowing the resinous material to cure and harden; and removing the bladder tube to leave the liner tube cured in place at the area in need of repair.

2. The method of claim 1 wherein the liner tube further comprises a coating at least partially surrounding the second layer.

3. The method of claim 2 wherein the coating is resin and air impervious.

4. The method of claim 3 wherein the coating is a polymer.

5. The method of claim 1 wherein the pipe is a lateral pipe in fluid communication with a main pipe; and wherein the area in need of repair comprises a juncture of the lateral pipe and the main pipe.

6. The method of claim 1 wherein the second layer of the liner tube comprises a felt material.

7. The method of claim 1 wherein the liner tube further comprises a third layer comprising a resin-absorbent material disposed on a side of the first layer opposite the second layer.

8. The method of claim 7 wherein the liner tube further comprises a coating at least partially surrounding the third layer.

9. The method of claim 7 wherein the third layer of the liner tube comprises a felt material.

10. The method of claim 1 further comprising determining a repair distance between a first end of the area in need of repair and a second end of the area in need of repair.

11. The method of claim 10, wherein the second end of the area in need of repair comprises a juncture of a lateral pipe and a main pipe.

12. The method of claim 11 wherein the liner tube is sized lengthwise equal to the repair distance.

13. The method of claim 12 wherein after the liner tube is secured within the bladder tube at a position such that after the liner assembly has been inverted into the pipe, the first end of the liner tube is proximate the first end of the area in need of repair in the lateral pipe, and the second end of the liner tube is proximate the juncture of the lateral and main pipes.

14. The method of claim 1 wherein the liner tube is secured to the bladder tube using an adhesive or solvent.

15. The method of claim 1 wherein inverting the liner assembly through the pipe to an inverted position places the liner tube on the outside of the bladder tube adjacent the area in need of repair.

16. The method of claim 1 wherein the liner tube further comprises shards of glass or chopped glass associated with the non-stretching material.

17. A method of making a cured-in-place pipe repair to a lateral pipe having a launching end and an opposite second end at a juncture with a main pipe and having an area in need of repair, comprising:
   providing an elongated bladder tube having a first bladder tube end and a second bladder tube end;
   providing an elongated liner tube having a longitudinal direction connecting a first liner tube end and a second liner tube end and comprising at least one layer comprising strands of a substantially non-stretching material substantially parallel to the longitudinal direction of the liner tube, and a second layer comprising a resin-absorbent material;
   wherein the liner tube is substantially free of strands of substantially non-stretching material oriented ninety-degrees to the longitudinal direction of the liner tube to allow for radial expansion;
   wherein the non-stretching material comprises strands of glass, carbon fiber or fiber glass oriented substantially parallel to the longitudinal direction of the liner tube;
   determining a repair distance by measuring the distance between a first end of the area of the lateral pipe in need of repair and the juncture of the main and lateral pipes;
   determining a non-repair distance by measuring the distance between the launching end of the lateral pipe and the first end of the area of the lateral pipe in need of repair;
   sizing the length of the liner tube equal to the repair distance of the area in need of repair;
   positioning the liner tube within the bladder tube such that the first end of the liner tube is spaced apart from the first end of the bladder tube by the non-repair distance;
   securing the liner tube to the bladder tube to form a liner assembly;
   impregnating the liner tube with a resinous material capable of curing and hardening;
   inverting the liner assembly into the lateral pipe such that the liner tube is adjacent the area of the lateral pipe in need of repair with the second end of the liner tube proximate the juncture of the main and lateral pipes;
   allowing the resinous material to cure and harden; and
   removing the bladder tube from the liner tube to leave the liner tube cured in place proximate the area in need of repair within the lateral pipe.

18. The method of claim 17 further comprising attaching the first end of the bladder tube to a launching device.

19. The method of claim 18 further comprising positioning the launching device remote from the lateral pipe.

20. The method of claim 19 wherein the bladder is closed about the second end.

21. The method of claim 17 wherein the bladder presses the liner tube against the lateral pipe at the area of the lateral pipe in need of repair.

22. The method of claim 17 wherein the liner tube further comprises a third layer comprising a resin-absorbent material disposed on a side of the first layer opposite the second layer.

23. The method of claim 22 wherein the second layer of the liner tube comprises a felt material.

24. The method of claim 22 wherein the third layer of the liner tube comprises a felt material.

25. The method of claim 17 wherein the liner tube is secured within the bladder tube by removably attaching the liner tube directly to the bladder tube.

26. The method of claim 25 wherein the liner tube is secured within the bladder tube using an adhesive.

27. The method of claim 26 wherein the adhesive does not soak into the liner tube.

28. The method of claim 17 wherein the first layer of the liner tube further comprises shards of glass or chopped glass associated with the strands of non-stretching material.

29. The method of claim 17 wherein the launching end of the lateral pipe is an opening of a cleanout pipe.

30. The method of claim 29 further comprising inserting a guide tool into the lateral pipe, the guide tool being adapted to guide the bladder tube from the cleanout pipe and into the lateral pipe.

31. The method of claim 30 wherein the guide tool includes an arcuate portion adapted to guide the bladder tube into the lateral pipe.

32. The method of claim 30 wherein the guide tool includes a hollow cylindrical portion for protecting the bladder tube and an arcuate portion extending from the cylindrical portion, the arcuate portion adapted to guide the liner assembly into the lateral pipe.

33. The method of claim 17 wherein the bladder is translucent.

34. A liner assembly for use in making a cured-in-place repair to a pipe having a launching end and having an area in need of repair, comprising:

an elongated bladder tube having a first end and a second end;

an elongated liner tube having a longitudinal direction connecting a first liner tube end and a second liner tube end and comprising at least one layer comprising strands of a substantially non-stretching material substantially parallel to the longitudinal direction of the liner tube, and a second layer comprising a resin-absorbent material;

wherein the liner tube is substantially free of strands of substantially non-stretching material oriented ninety-degrees to the longitudinal direction of the liner tube to allow for radial expansion;

wherein the liner tube is disposed within the bladder tube and secured to the bladder tube, and wherein the non-stretching material comprises strands of glass, carbon fiber, or fiber glass oriented substantially parallel to the longitudinal direction of the liner tube.

35. The liner assembly of claim 34 wherein the liner tube is spaced apart from the first end of the bladder tube by approximately the distance between the launching end of the pipe and a first end of the area in need of repair of the pipe; and wherein the liner tube has a length approximately equal to the distance between the first end of the area in need of repair and a second end of the area in need of repair.

36. The liner assembly of claim 34 wherein the liner tube further comprises shards of glass or chopped glass associated with the strands of the non-stretching material.

37. The liner assembly of claim 34 wherein the liner tube further comprises a third layer comprising a resin-absorbent material disposed on a side of the first layer opposite the second layer.

38. The method of claim 37 wherein the second layer of the liner tube comprises a felt material.

39. The method of claim 37 wherein the third layer of the liner tube comprises a felt material.

40. The liner assembly of claim 34 further comprising a launcher device attached to the first end of the bladder tube for inverting the liner assembly.

41. The liner assembly of claim 34 wherein the second end of the bladder tube is closed.

42. The liner assembly of claim 34 wherein the liner tube is secured to the bladder tube with a frangible connection.

43. The liner assembly of claim 34 wherein the bladder tube is translucent.

44. The liner assembly of claim 34 further comprising a resinous material capable of curing and hardening impregnated into the liner tube.

* * * * *